United States Patent [19]

Reeves

[11] 4,358,082
[45] Nov. 9, 1982

[54] SHOCK ABSORBENT SUPPORT FOR AN ELONGATE MEMBER

[76] Inventor: James Reeves, 1924 Linn St., North Kansas City, Mo. 64116

[21] Appl. No.: 226,233

[22] Filed: Jan. 19, 1981

[51] Int. Cl.³ .............................................. B05B 15/06
[52] U.S. Cl. .................................. 248/75; 248/68 R; 280/422
[58] Field of Search .................. 248/49, 50, 75, 58, 248/60, 51, 53, 74 PB, 68 R, 610, 634; 224/309, 317; 137/355.17, 351; 280/420, 421, 422

[56] References Cited

U.S. PATENT DOCUMENTS

| | | | |
|---|---|---|---|
| 2,554,176 | 5/1951 | Edwards | 248/58 X |
| 2,660,679 | 11/1953 | Hunt | 248/422 X |
| 2,932,475 | 4/1960 | Strogan | 248/75 X |
| 2,948,450 | 8/1960 | Dobrikin | 280/421 X |
| 2,984,445 | 5/1961 | Dobrikin | 248/75 |
| 3,420,546 | 1/1969 | Jasovsky | 248/51 X |
| 3,628,811 | 12/1971 | Rivers | 280/422 X |
| 3,650,545 | 3/1972 | Freed | 280/421 |
| 3,888,513 | 6/1975 | Pilz et al. | 280/422 X |
| 4,148,113 | 4/1979 | Dvorachek | 248/74 PB X |
| 4,244,544 | 1/1981 | Kornat | 248/68 R |

FOREIGN PATENT DOCUMENTS 2446133 4/1975 Fed. Rep. of Germany ... 248/74 PB

Primary Examiner—William H. Schultz
Assistant Examiner—Ramon O. Ramirez
Attorney, Agent, or Firm—Litman, Day & McMahon

[57] ABSTRACT

A shock absorbent support for an elongate member comprises a resilient shank with opposite first and second ends and an attachment means at the first end. A resilient body member at the second end has a slot with a receptacle portion and divides the body member into adjoining fingers each having an edge. The fingers are partable whereby the edges are sufficiently spaced for an elongate member to pass therebetween into the receptacle portion. A strap has a first end portion connectible to one of the fingers and a free end portion detachably connectible to another of the fingers for retaining the fingers in mutually closed relationship for retention of the elongate member in the receptacle portion.

11 Claims, 4 Drawing Figures

U.S. Patent  Nov. 9, 1982  4,358,082
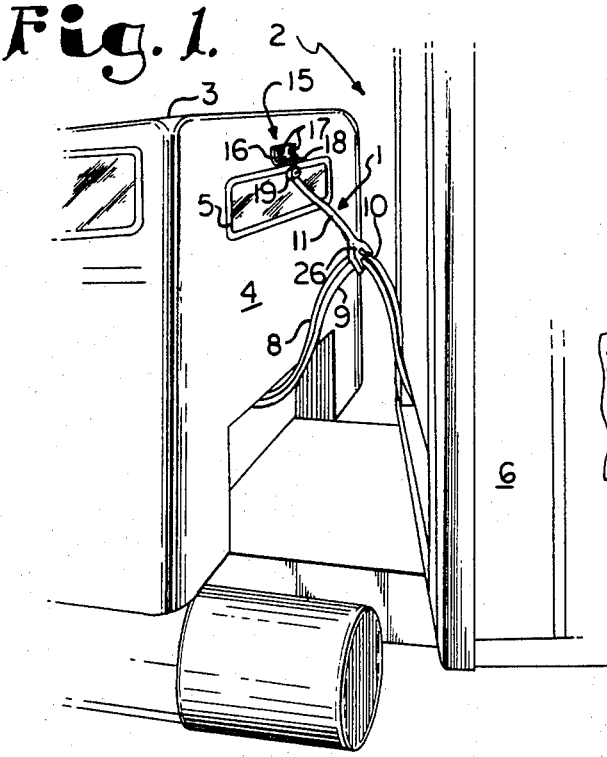
Fig. 1.
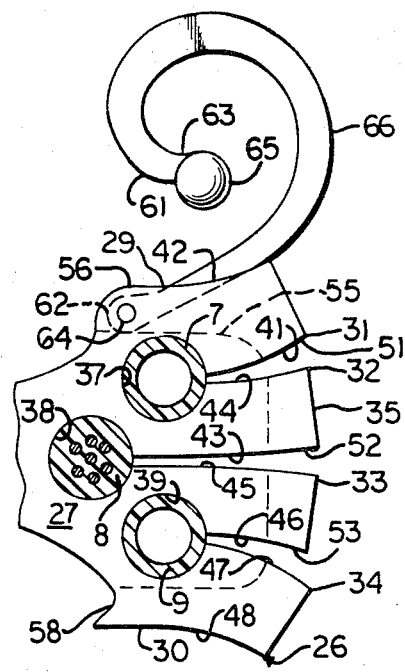
Fig. 4.
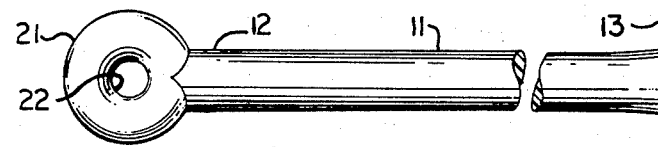
Fig. 2.
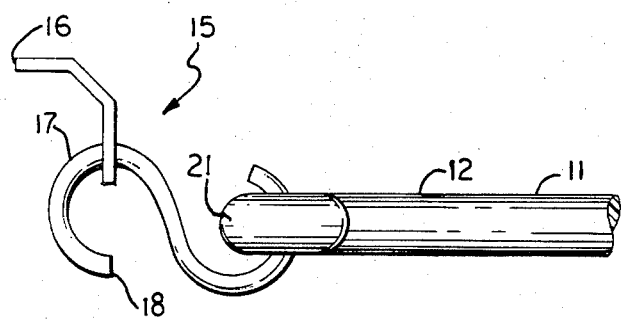
Fig. 3.
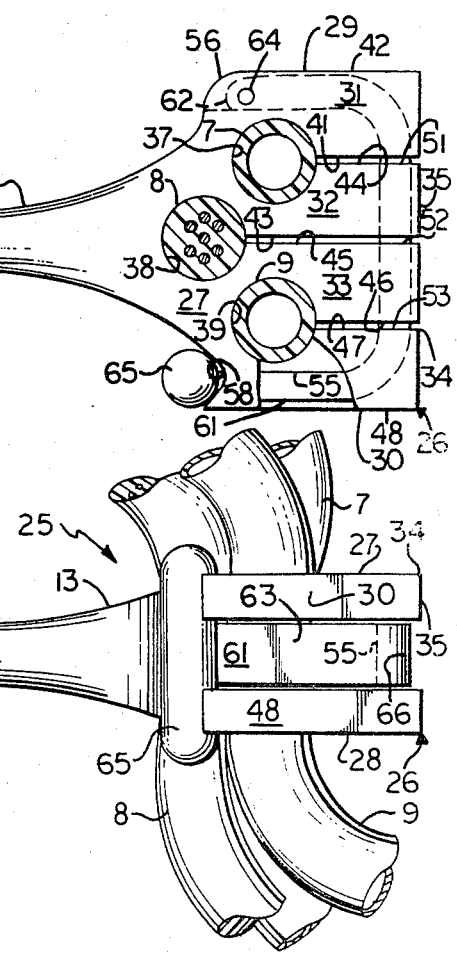

SHOCK ABSORBENT SUPPORT FOR AN ELONGATE MEMBER

BACKGROUND OF THE INVENTION

This invention relates to shock absorbent supports for elongate members, and in particular to a support for hose and cable members extending between truck cab and trailer vehicles.

Trucks which comprise a cab (tractor) vehicle and a trailer vehicle generally have one or more elongate hose and electrical cable members extending therebetween. For example, a typical arrangement includes two air hoses for conveying air from the cab to the brakes of the trailer vehicle and an electrical cable for interconnecting the respective electrical systems of the cab and trailer vehicles. Such hose and cable members are required to be of sufficient length to accommodate articulation and flexing of the vehicles relative to each other as the truck turns and negotiates inclined surfaces, and therefore have substantial slack portions when the vehicles are aligned.

Such slack portions are typically arrayed in large loops which are then somewhat flattened as the slack is taken out of the hose and cable members when the vehicles articulate or flex with respect to each other. Because of the significant flexibility of such hose and cable members, means must be provided for supporting same in their looped configurations and to prevent damage thereto by abrasion or tangling with other parts of the vehicles. Preferably such support means is quickly and easily releasable from the members without the use of tools for disconnecting respective tractor and trailer vehicles because such operations are often conducted in unsheltered areas under adverse conditions.

One heretofore conventional method of supporting such flexible members utilizes one or more steel springs which connect at one end to a type of mounting bracket commonly found attached to many cab vehicles for this purpose and at the other end to the hose and cable members. However, such springs tend to rattle against and scratch the backs of respective cab vehicles and their clamping means typically are secured with nuts and bolts thereby requiring the use of tools for disconnecting same as when the respective cab and trailer vehicles are separated.

Other devices for supporting flexible hoses and cables between interconnected vehicles include those shown in the Dobrikin U.S. Pat. Nos. 2,948,450 and 2,984,445 and that shown in the Freed U.S. Pat. No. 3,650,545. However, none of these devices are compatible with the aforedescribed mounting brackets and thus require special mounting mechanisms. Also, tools are required to disconnect the hose and cable members supported by the devices shown in these patents. Further, such prior art devices tended to be complex, either in structure or in manufacture, necessitating a relatively high cost to the user.

SUMMARY OF THE INVENTION

The present invention seeks to overcome the above difficulties and comprises a shock absorbent support for an elongate member comprising a resilient shank with first and second ends and an attachment means at the first end. A resilient body member at the second end allows adjoining fingers thereof to be parted for receiving an elongate member within a receptacle portion of a slot through the body member. A closure member has first and second end portions each attached to a respective finger, the second end portion being manually releasable and reattachable without the use of tools.

The principle objects of the present invention are: to provide a support for an elongate member comprising a resilient material; to provide such a support having adjoined fingers; to provide such a support having a strap with a first end portion attached to one of the fingers and a second end portion thereof selectively attachable to another finger for retaining the elongate member within a clamp body; to provide such a support wherein the second strap end portion is manually removable and reattachable to the other finger without the use of tools; to provide such a support which is adapted for supporting flexible hose and cable members extending between articulated interconnected vehicles; to provide such a support which includes a resilient stretchable shank extending therefrom for attachment to one of the vehicles; to provide such a support wherein said shank is attachable to a standard mounting bracket commonly attached to such vehicles; to provide such a support wherein the shank comprises a material which will not scratch or otherwise damage a vehicle coming into contact therewith; to provide such a support which may be quickly and easily detached from such elongate members without tools; to provide such a support which does not require special mounting means for attachment to a vehicle; and to provide such a support which is economical to manufacture, efficient in use, capable of a long operating life and particularly well adapted for the proposed use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a support embodying the present invention, shown attached to a cab vehicle and supporting elongate flexible hose and cable members.

FIG. 2 is an enlarged, fragmentary, top plan view of the support with portions broken away to reveal the construction thereof.

FIG. 3 is an enlarged, fragmentary, side elevational view of the support particularly showing it attached to a mounting bracket by an "S" hook and to a plurality of hose and cable members.

FIG. 4 is an enlarged, fragmentary, top plan view of the support particularly showing a strap with an end portion free and adjoining fingers of a clamp body parted to a partially open position.

DESCRIPTION OF THE PREFERRED EMBODIMENTS

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally indicates a shock absorbent support for an elongate member embodying this invention. The support 1 is shown in FIG. 1 attached to a truck 2 comprising a cab vehicle 3 with a back 4 and a rear window 5. The truck 2 also includes a trailer vehicle 6 interconnected with the cab vehicle 3. A universal connection (not shown) between the cab and trailer vehicles 3 and 6 respectively allows limited articulation and flexing therebetween as the truck 2 turns and negotiates inclined surfaces.

Communicating with the cab and trailer vehicles 3 and 6 respectively are first, second and third elongate members 7, 8 and 9 respectively. The elongate members 7 and 9 comprise air hoses for communicating pressurized air from the cab vehicle 3 to air brakes on the trailer vehicle 6. The elongate member 8 comprises an electrical cable interconnecting the electrical systems of the cab and trailer vehicles 3 and 6 respectively. Although a configuration with two air hoses 7 and 9 and an electrical cable 8 has been shown and is typical of trucks such as that designated 2 with the cab and trailer vehicles 3 and 6 respectively, the present invention is adapted for supporting virtually any combination of one or more elongate members.

The elongate members 7, 8 and 9 each have a pair of opposed ends (not shown), one of which is attached to the cab vehicle 3 and the other of which is attached to the trailer vehicle 6. Such elongate member opposed ends may typically be disconnected from respective vehicles when the elongate members 7, 8 and 9 require repairing or replacement. The distance between the opposed ends of each respective elongate member 7, 8 and 9 varies as the cab and trailer vehicles 3 and 6 respectively articulate and flex with respect to each other. For example, the distance therebetween is relatively small when the vehicles 3 and 6 are aligned as when the truck 2 is traveling straight on a level surface. On the other hand, when the truck 2 "jackknifes" as during a very tight turn, the distances therebetween are considerably greater. Although the hose and cable members 7, 8 and 9 are flexible, they are generally not very stretchable, because air hoses such as 7 and 9 typically comprise reinforced rubber and electrical cables such as 8 have solid or stranded metal wires running therethrough. Thus, each elongate member 7, 8 and 9 must be of a length equal to or greater than the maximum spacing between respective connection points of its respective opposed ends.

A considerable part of the total length of each elongate member 7, 8 and 9 comprises a slack portion 10 when the vehicles 3 and 6 are substantially aligned with respect to each other. The slack portions 10 are typically gathered into upwardly extending loops positioned between the cab and trailer vehicles 3 and 6 respectively (FIG. 1) to prevent damage and abrasion thereto which would otherwise result if they were allowed to dangle freely and be exposed to other parts of the truck 2 or even a road surface. Also, by thus supporting the elongate members 7, 8 and 9, they are less likely to come in contact with and be deteriorated by oil, water and other substances which may accumulate on portions of the truck 2.

The support 1 includes a shank 11 with first and second ends 12 and 13 respectively. The shank 11 is preferably comprised of a resilient elastomeric material which is stretchable to selectively hold up the elongate member slack portions 10 in looped configurations and to release the slack portions 10 to flatten out as the vehicles 3 and 6 articulate with respect to each other. Associated with and attached to the shank first end 12 is a ring 21 with an eye 22 therethrough. The eye 21 is adapted for receiving an S-hook 18 therein whereby the support 1 is suspended from the cab vehicle 3. An atachment means 15 is provided for connecting the shank first end 12 to the cab vehicle back 4 and includes a bracket 16 attached to the cab vehicle back 3 by bolts 17. Such brackets 16 are commonly found on cab vehicles 3 and are generally positioned as shown centered over the back window 5 of a respective cab vehicle 3. The bracket 16 has an aperture (not shown) therethrough for receiving the S-hook 18.

Attached to and associated with the shank second end 13 is a clamp body member 26 having a first surface 27 and a second surface 28. The clamp body member 26 has a pair of spaced first and second sidewalls 29 and 30 respectively, an endwall 35 and is comprised of a resilient, elastomeric material. The clamp body member 26 also includes first, second, third and fourth adjoining fingers 31, 32, 33 and 34 respectively, each having an inner side edge 41, 43, 45 and 47 respectively and an outer side edge 42, 44, 46 and 48. The first and fourth finger outer side edges 42 and 48 respectively define a first sidewall 29 and a second sidewalls 29 and 30 and their respective inner side edges 41 and 47 each extend from the endwall 35 into the clamp body member 26. The second and third finger inner side edges 43 and 45 respectively and respective outer side edges 44 and 46 thereof also extend from the endwall 35 into the clamp body member 26.

First, second and third slots 51, 52 and 53 are defined by respective opposed pairs of finger side edges 41 and 44, 43 and 45, and 46 and 47 respectively and have first, second and third receptacle portions 37, 38 and 39 respectively in spaced relation from the endwall 30. The receptacle portions 37, 38 and 39 have substantially circular configurations and are adapted for receiving the elongate members 7, 8 and 9 respectively therein in snug fitting relation (FIG. 3). As shown in FIGS. 2 and 4, the air hoses 7 and 9 are positioned in the first and third receptacle portions 37 and 39 and the electrical cable 8 is positioned in the second receptacle portion 38.

The slots 51, 52 and 53 are shown in their narrowest configurations in FIG. 2 with the clamp body member 26 in its closed position for retaining the elongate members 7, 8 and 9 within receptacle portions 37, 38 and 39 respectively. As shown in FIG. 4, the fingers 31–34 comprising the clamp body member 26 are partable to increase the size of the slots 51, 52 and 53. When sufficiently wide, the slots 51, 52 and 53 will admit respective elongate members 7, 8 and 9 therethrough from the endwall 35 and into respective receptacle portions 37, 38 and 39. Generally, the elongate members 7, 8 and 9 will be inserted into respective receptacle portions 37, 38 and 39 one at a time rather than simultaneously. Therefore, the fingers adjacent to a respective slot 51, 52 or 53 are allowed to bend or flex to the extent necessary. For example, when the electrical cable 8 is inserted in or removed from the second receptacle portion 38, the second slot 52 widens so that respective side edges 43 and 45 are spaced substantially the diameter of the electrical cable 8. The second and third fingers 32 and 33 respectively are thus crowded outwardly against the first and fourth fingers 31 and 34 respectively, thereby urging the opposed pairs of respective side edges 41 and 44 and 46 and 47 together.

Although the elasticity of the clamp body member 26 will naturally tend to retain it in its closed position with the fingers 31-34 in mutually closed relationship as shown in FIG. 2, a closure member such as a strap 61 with first and second opposed end portions 62 and 63 and a middle portion 66 is provided for selectively securing the clamp body member 26 in its closed position. The strap 61 is selectively received within a groove 55 in the sidewalls 29 and 30 and in the endwall 35 which partially surrounds the clamp body member 26. The slot 55 terminates in a boss 56 on the first finger outer side edge 42 and a recess 58 on the fourth finger outer side edge 48. The boss 56 has a pair of opposed apertures (not shown) opening into groove 55 for receiving a pin 64 extending transversely through the strap first end portion 62. Preferably these apertures do not extend completely through the boss 56 so that the pin 64 is completely encased within the boss 56 and the strap first end portion 62, to prevent it from scratching or otherwise damaging the cab vehicle 4 in the event of contact therebetween. Alternatively, the first pin 64 may be of a length slightly less than the thickness of the boss 56 so that it is thus recessed within the apertures therethrough.

A fastening means for detachably connecting said strap second end portion 63 to said second sidewall 30 comprises a handle 65 mounted on said second end portion 63 and engageable in the recess 58. The strap 61 is preferably comprised of a stretchable resilient material so that, when placing it within the groove 55 it can be stretched sufficiently for the handle 65 to be received within the recess 58. To release the strap 61 for opening the clamp body 26, the handle 65 may be grasped and pulled to stretch the strap 61 and disengage the handle 65 from the recess 58.

Certain parts of the shock absorbent support 1 are preferably comprised of an elastomeric material. For example, ethylene-propylene diene monomer (EPDM) is an elastomer which may be vulcanized with sulpher to increase its resistance to ozone, acids and alkalies and to provide a temperature range for this material from approximately minus 60 to plus 300 degrees Fahrenheit. Such properties are highly desirable for the support 1 of the present invention which, in use on the truck 2, must retain its resiliency under extreme temperature and weather conditions after prolonged exposure to the elements. Such as elasotmer is available under the trade name "Nordel" and comprises an ethylene-propylene-hexadiene terpolymer which is sulphur curable. It will be appreciated that a variety of other elastomeric materials may be utilized to fabricate the clamp 1 of the present invention including ethylene-propylene rubber (EPR) or natural rubber.

The elastomeric material comprising the shank 11 preferably has a hardness within a range of approximately 40 to 70 durometer. A shank 11 with a length of 24 inches, a diameter of ⅜ inches and a hardness in this range is stretchable to a length of approximately 49 inches. The shank 11 with these properties provides sufficient support for the slack portions 10 of the elongate members 7, 8 and 9 when the cab and trailer vehicles 3 and 6 respectively are aligned and also is sufficiently stretchable to allow the slack portions 10 to flatten out as the vehicles 3 and 6 articulate with respect to each other without subjecting the elongate members 7, 8 and 9 to excessive stress and damage.

The middle portion 66 of the strap 61 is also preferably comprised of 40 to 70 durometer elastomeric material to provide sufficient stretchability for attaching and detaching the strap second end portion 63 to said second sidewall 30 while providing sufficient resiliency so that the elongate members 7, 8 and 9 are snugly gripped and retained within receptacle portions 37, 38 and 39 respectively with the fingers 31, 32, 33 and 34 retained in mutually closed relationship.

The elastomeric material comprising the strap first and second end portions 62 and 63 respectively and the handle 65, on the other hand, has a hardness in the range of 80 to 100 durometer to provide additional strength in these areas which connect with the clamp body member 26.

The ring 21 and the clamp body member 26 are also preferably comprised of a harder elastomeric material having an 80 to 100 durometer. Stretchability is not as important with the ring 21 and the clamp body member 26 as it is with the shank 11 and the strap 61. Elastomeric material with 80 to 100 durometer hardness provides sufficient resiliency for the clamp body member 26 to be spread to its open position (FIG. 4) and yet be sufficiently hard to tightly and firmly secure the elongate members 7, 8 and 9 within the receptacle portions 37, 38 and 39 respectively. Therefore, it will be appreciated that by comprising the support 1 of elastomeric material having different durometers where most appropriate, a proper amount of tension will be exerted against the elongate members 7, 8 and 9 by the shank 11 and a tight grip thereon will be provided by the clamp body member 26.

In use for supporting the slack portions 10 of the elongate members 7, 8 and 9 between the cab and trailer vehicles 3 and 6 respectively, the support 1 is attached to the cab vehicle 3 by positioning the S-hook 18 in an aperture (not shown) through the bracket 16 and through the ring aperture 22. Brackets such as that shown at 16 are readily available and found on many cab vehicles and positioned as shown centered over the back window 5. The S-hook 18 may then be bent into a tighter configuration to more securely retain bracket 16 and ring 21. With the strap second end portion 63 detached from the clamp body member 26, the slots 51, 52 and 53 may be sufficiently widened by spreading the adjacent pairs of fingers 31, and 32, 32 and 33, and 33 and 34 to allow the respective elongate members 7, 8 and 9 to each pass therethrough from the endwall 35 and into the receptacle portions 37, 38 and 39 respectively. The fingers 31, 32, 33 and 34 are then pulled together in mutually closed relationship and the strap 61 is stretched and positioned in the groove 55. The recess 58 receives the handle 65 for retaining the strap 61 tightly stretched through the groove 55 for snugly clamping the elongate members 7, 8 and 9 within the apertures 37, 38 and 39 respectively. Therefore, with the vehicles 3 and 6 aligned, the slack portions 10 of the elongate members 7, 8 and 9 will be retained in the looped configurations and damage thereto will thus be prevented. It will be appreciated that the elastomeric material of which the shock absorbant support 1 is primarily comprised will not scratch, mar or otherwise damage the cab or trailer vehicles 3 and 6 respectively in the event of contact therebetween. The elasticity of shank 11 allows the slack portions 10 to be flattened out as the cab and trailer vehicles articulate with respect to each other without damage to the flexible members 7, 8 and 9.

It is to be understood that while certain forms of this invention have been illustrated and described, it is not to be limited thereto except insofar as such limitations are included in the following claims.

What is claimed and desired to secure by Letters Patent is:

1. A shock absorbent support for an elongate member comprising:
   (a) a shank of resilient, stretchable elastomeric material having opposite first and second ends;
   (b) attachment means at said first end adapted for attaching said shank to a support structure;
   (c) a body member comprising resilient, elastomeric material and being integrally connected to said shank second end and formed as one piece with said shank; said body member including:
      (1) a pair of opposite sidewalls;
      (2) an endwall positioned opposite said shank second end;
      (3) a pair of substantially parallel opposite edges extending into said body member and defining a slot terminating therein, said slot opening onto said endwall and having an inner, receptacle portion extending through said body member and sized for snug, gripping engagement with said elongate member;
      (4) a pair of integrally connected fingers separated by said slot, said fingers being resiliently partable whereby said slot is widened sufficiently for said elongate member to pass therethrough to said receptacle portion, said resilience of said body member biasing said fingers toward each other whereby said slot is narrowed and said elongate member retained in said receptacle portion;
   (d) an elastomeric, longitudinally stretchable strap having a first end portion fixed to said body member at one of said sidewalls in spaced relation from said endwall and a second end portion detachably connectable to said body member at the other of said sidewalls in spaced relation from said endwall, said strap adapted for being stretched across said sidewalls and said endwall whereby said slot is substantially closed with said edges in close-spaced, abutting relation with said strap second end portion connected to said body member; and
   (e) fastening means for detachably fastening said strap second end portion to said body member at said other sidewall in spaced relation from said endwall.

2. A support as set forth in claim 1 wherein:
   (a) said receptacle portion extends through said body member and is generally cylindrical; and
   (b) said receptacle portion is sized for snug engagement with said elongate member.

3. A support as set forth in claim 1 wherein:
   (a) said other of said sidewalls includes a recess; and
   (b) said fastening means includes a handle mounted on said closure member second end, said handle being engageable in said recess for detachable connection with said other of said sidewalls.

4. A support as set forth in claim 1 wherein:
   (a) said body member is comprised of an elastomeric material having a predetermined hardness greater than a predetermined hardness of said shank.

5. A shock absorbent support for elongate members comprising:
   (a) a shank of resilient, elastomeric material having opposite first and second ends;
   (b) an attachment means at said first end adapted for connection to a support structure and including a bracket mountable to said support structure; an S-shaped hook member and an eye in said first end, said hook member connected to said bracket and said eye;
   (c) a body member of resilient elastomeric material at said second end; said body member having sidewalls and an endwall;
   (d) said body member having a plurality of substantially parallel edges extending thereinto and defining respective slots terminating therein, said slots opening onto said endwall and dividing said body member into a plurality of adjoining fingers respectively resiliently partable for entry of respective elongate members;
   (e) said slots respectively having inner, receptacle portions each extending through said body member and substantially cylindrical in shape and sized for snug, gripping engagement with a respective one of said elongate members;
   (f) an elastomeric longitudinally stretchable strap having a first end portion affixed to one of said fingers at one of said sidewalls in spaced relation from said endwall and positionable along said sidewalls and across said endwall in closure relationship for retaining said fingers mutually closed with said edges in close-spaced, abutting relation, said strap having a second end portion detachably connectable to another of said fingers at the other of said sidewalls in spaced relation from said endwall for opening and closing of said fingers; and
   (g) a fastening means at said strap second end portion for detachably connecting said second end portion to said other of said fingers.

6. The support as set forth in claim 5 wherein:
   (a) said other of said sidewalls includes a recess; and
   (b) said fastening means includes a handle mounted on said strap second end portion, said handle being engageable in said recess for detachable connection with said other of said sidewalls.

7. A support as set forth in claim 5 which includes:
   (a) said sidewalls and said endwall having a groove partially surrounding said fingers, said groove receiving said strap when said second end portion is connected to said other of said sidewalls for closing said fingers.

8. A support as set forth in claim 5 which includes:
   (a) said elastomeric material comprising said shank having a hardness in the range of 40 to 70 durometer; and
   (b) said elastomeric material comprising said body member having a hardness in the range of 80 to 100 durometer.

9. A support as set forth in claim 5 which includes:
   (a) said materials comprising said shank and said body member being ethylene propylene rubber.

10. The support as set forth in claim 5 wherein:
    (a) said elastomeric strap includes a middle portion between said first end portion and said second end portion thereof;
    (b) said middle portion is comprised of an elastomeric material having a hardness in the range of 40 to 70 durometer; and (c) said strap end portions are each comprised of an elastomeric material having a hardness in the range of 80 to 100 durometer.

11. A shock absorbent support for a plurality of elongate members interconnecting a cab vehicle and a trailer vehicle which comprises:
   (a) a shank of resilient, stretchable elastomeric material having opposite first and second ends;
   (b) attachment means adapted for connecting said shank first end to said cab vehicle;
   (c) a body member comprising resilient, elastomeric material integrally connected to said shank second end and formed as one piece with said shank; said body member including:
      (1) a pair of opposite sidewalls;
      (2) an endwall positioned opposite said shank second end;
      (3) a plurality of pairs of substantially parallel opposite edges extending into said body member;
      (4) each said pair of edges defining a slot terminating in said body member and opening onto said endwall, each said slot having an inner, receptacle portion extending through said body member and sized for snug, gripping engagement with a respective elongate member;
      (5) a plurality of integrally connected fingers separated by said slots, said fingers being resiliently partable whereby each said slot may be widened sufficiently for said respective elongate member to pass therethrough to said receptacle portion, said resilience of said body member biasing said fingers toward each other whereby said slots are narrowed with said elongate members retained in said respective receptacle portions;
   (d) an elastomeric, longitudinally stretchable strap having a first end portion fixed to said body member at one of said sidewalls in spaced relation from said endwall and a second end portion detachably connectable to said body member at the other of said sidewalls in spaced relation from said endwall, said strap adapted for being stretched across said sidewalls and said endwall whereby said slots are substantially closed with responding pairs of said edges in close-spaced, abutting relation with said strap second end portion connected to said body member; and
   (e) fastening means for detachably fastening said strap second end portion to said body member at said other said other sidewall in spaced relation from said endwall.

* * * * *